United States Patent
Mollhagen

(10) Patent No.: US 7,147,073 B2
(45) Date of Patent: Dec. 12, 2006

(54) TRAVEL DRIVE FOR HEAVY GOODS VEHICLES

(75) Inventor: Klaus-Peter Mollhagen, Memingen (DE)

(73) Assignee: Liebherr-Werk Biberach GmbH, Biberach an der Riss (DE)

(*) Notice: Subject to any disclaimer, the term of this patent is extended or adjusted under 35 U.S.C. 154(b) by 375 days.

(21) Appl. No.: 10/425,416

(22) Filed: Apr. 29, 2003

(65) Prior Publication Data

US 2004/0036245 A1    Feb. 26, 2004

(30) Foreign Application Priority Data

Apr. 29, 2002 (DE) .................. 202 06 821 U

(51) Int. Cl.
*B60K 7/00* (2006.01)

(52) U.S. Cl. ............... 180/65.5; 180/65.6; 301/36.1; 188/18

(58) Field of Classification Search ......... 280/124.111, 280/124.116, 124.112, 124.156; 180/24.07, 180/348, 349, 60, 62, 53.6, 53.7, 297, 65.5, 180/65.6, 65.7; 298/22; 188/18; 318/13; 301/36.1

See application file for complete search history.

(56) References Cited

U.S. PATENT DOCUMENTS

| | | | | |
|---|---|---|---|---|
| 2,674,489 A * | 4/1954 | Maxon, Jr. | ............... | 298/17 R |
| 3,552,798 A * | 1/1971 | Cole et al. | ................ | 298/22 R |
| 3,840,244 A * | 10/1974 | Gee et al. | .............. | 280/124.11 |
| 3,897,843 A | 8/1975 | Hapeman et al. | | |
| 3,897,972 A * | 8/1975 | Logue | ..................... | 296/183.1 |
| 3,940,163 A * | 2/1976 | Davis et al. | ............... | 280/6.15 |
| 4,010,830 A | 3/1977 | Logus et al. | | |
| 4,040,312 A | 8/1977 | Tappan et al. | | |
| 4,071,277 A * | 1/1978 | Stedman | .................... | 298/22 P |
| 4,389,586 A * | 6/1983 | Foster et al. | .............. | 310/67 R |
| 4,437,530 A * | 3/1984 | De Young et al. | .......... | 180/372 |
| 4,799,564 A * | 1/1989 | Iijima et al. | ............... | 180/65.5 |
| 5,289,905 A * | 3/1994 | Braschler | ..................... | 188/296 |
| 5,924,504 A * | 7/1999 | Ruppert et al. | ............... | 180/61 |
| 6,022,068 A * | 2/2000 | D'Amico | ................. | 296/183.2 |
| 6,086,076 A * | 7/2000 | Prem et al. | ........... | 280/124.111 |
| 6,129,409 A * | 10/2000 | D'Amico | ................. | 296/183.2 |
| 6,328,123 B1 * | 12/2001 | Niemann et al. | .......... | 180/65.5 |
| 6,537,167 B1 * | 3/2003 | Gazyakan et al. | ............. | 475/5 |
| 2002/0045510 A1 | 4/2002 | Damm et al. | | |

FOREIGN PATENT DOCUMENTS

| | | |
|---|---|---|
| DE | 1755126 | 12/1971 |
| DE | 19732637 | 2/1999 |
| EP | 0084732 | 8/2003 |
| WO | 92/04196 | 3/1992 |
| WO | 01/53141 | 7/2001 |

* cited by examiner

Primary Examiner—David R. Dunn
Assistant Examiner—Toan C. To
(74) Attorney, Agent, or Firm—Dilworth & Barrese LLP

(57) ABSTRACT

A heavy goods vehicle has several wheel pairs forming a driven wheel axle, which wheel pairs are each supported by a separate rocker arm, which extends between the wheels of the respective wheel pairs and carries on opposite sides two wheel hubs on which the wheels can be attached. For each wheel of the wheel pair there is provided an independent wheel drive which consists of an electric motor and a reduction stage, which transfers the drive motion of the electric motor to the respective wheel hub. For each wheel of the wheel pair there is provided an independent wheel brake, which is arranged on an outside of the respective electric motor and/or the respective reduction stage facing away from the respective rocker arm and which is arranged, together with the respective electric motor and the respective reduction stage, inside the respective wheel hub and the associated wheel axle.

20 Claims, 5 Drawing Sheets

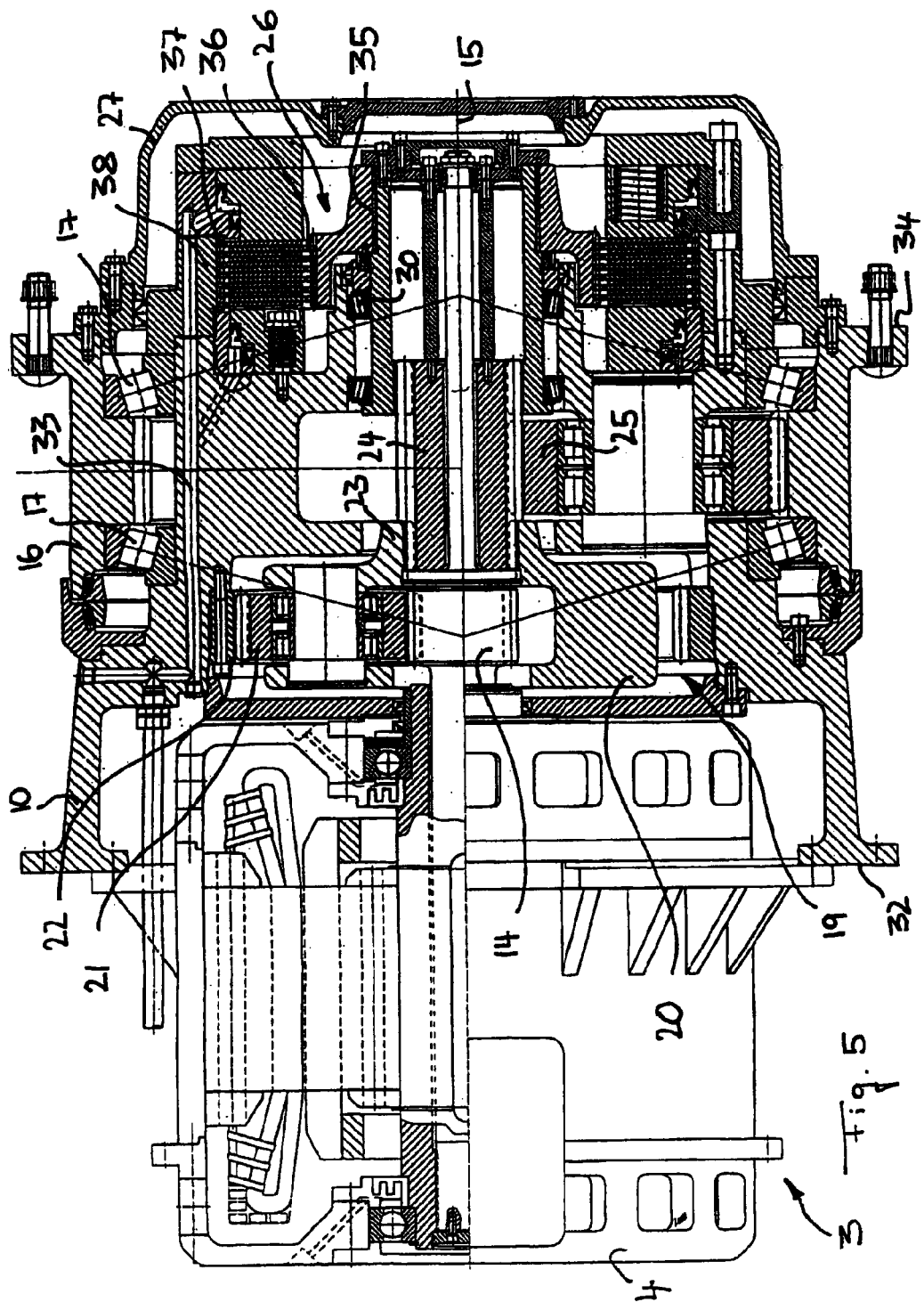

TRAVEL DRIVE FOR HEAVY GOODS VEHICLES

BACKGROUND OF THE INVENTION

The present invention relates to a travel drive for heavy goods vehicles, in particular bulk material dumping trucks of the so-called large dump truck type, with several wheel pairs forming a driven wheel axle, which wheel pairs are each supported by a separate rocker arm, which extends between the wheels of the respective wheel pairs and carries on opposite sides two wheel hubs on which the wheels can be attached, whereby there is provided for each wheel of the wheel pair an independent wheel drive consisting of an electric motor and a reduction stage, which transfers the drive motion of the electric motor to the respective wheel hub.

The so-called large dump trucks are chiefly used in mining operations for the transport of mined minerals and ores. These bulk material dumping trucks are produced in a size of several hundred tonnes in tare weight and payload, so that special travel drives are necessary to handle the corresponding huge forces and drive conditions.

A large dump truck with an independent wheel drive of the type mentioned at the outset is known for example from WO 92/04196. The rear axle of this large dump truck is formed by four wheels, which are combining in pairs and are mounted on two rocker arms supported in a mobile manner on the vehicle frame. The rocker arms extending between the wheel pairs carry on the right and left a pair of wheel hubs, on which the wheels are mounted. A separate electric motor is assigned to each of the wheels so that the wheels can be driven separately also at different speeds, particularly in order to prevent grinding of the wheels when travelling round tight corners.

Proceeding from the prior art, the problem underlying the present invention is to provide an improved travel drive for heavy duty vehicles of the type mentioned at the outset, which avoids drawbacks of the prior art and develops the latter in an advantageous way. A structurally improved design of the travel drive is preferably to be achieved.

SUMMARY OF THE INVENTION

According to the invention, a travel drive is provided to solve this problem. Preferred developments of the invention are the subject-matter herein.

According to the invention, therefore, there is provided for each wheel of the wheel pair an individual wheel brake, which is arranged on an outside of the respective electric motor and/or the respective reduction stage facing away from the respective rocker arm and which is arranged, together with the respective electric motor and the respective reduction stage, inside the respective wheel hub and the associated wheel axle. The external arrangement of the brakes inside the wheel hub creates a protected arrangement of the operating components as well as a compact structure of the travel drive. The electric motors with the associated reduction stages lie on the inside towards the respective rocker arm, whilst the brakes lie on the outside of the drive units.

In order to be able, in the limited internal space of the wheel axle and wheel hub, to achieve nonetheless a large transmission ratio, a planet gear is provided as the reduction stage in a development of the invention, said planet gear gearing down the drive motion of the electric motors. In particular, a dual planet gear stage with a gearing down in the range from 20 to 40 can be provided. When operating with the electric motors at speeds of the order of magnitude of 3500 revolutions per minute, speeds of approx. 100 revolutions per minute can be achieved on the wheels.

The electric motor and the reduction stage are preferably arranged with all their rotary axes parallel to the rotary axis of the respective wheel hub. The electric motor sits with its rotary axis preferably coaxial with the rotary axis of the corresponding wheel hub and drives a first planet carrier, which in turn drives the wheel hub via a further reduction stage.

In a development of the invention, the wheel axle, on which the wheel hub is mounted in a rotary manner, is formed by a casing of the electric motor or a casing of the reduction stage. Preferably, the motor casing and the gear casing are designed separately. The electric motors can each be accommodated in a central motor casing, which is rigidly connected to the respective rocker arm and on which the gear casing is flange-mounted. The gear casing at the same time forms the wheel axle, which supports the respective wheel hub in a rotary manner. The dual function of the gear casing leads to a weight-saving design and makes excellent use of the given space conditions.

The brakes arranged inside the wheel hub, which in principle are designed separate from the drive units, have in a manner known per se a stationary part and a rotating part. The stationary part of the brakes is preferably fixed to the end face of the wheel axles, in particular to the end face of the gear casing. The rotating part of the brakes could in principle be fixed to the wheel hub.

Preferably, however, the stationary part is fixed to the reduction stage element and rotates with respect to the wheel hub with a geared speed. In particular, the rotating part of the brakes can be coupled to the planet carrier, which is driven by the motor shaft, and rotate at its speed. The speed of the rotating part of the brakes geared with respect to the wheel hub permits particularly effective braking.

The brakes themselves can be designed differently. According to a preferred embodiment of the invention, the brakes can be designed as a disc brake. An alternative form of embodiment of the brakes consists in providing multiple disc brakes.

Each of the brakes preferably has a service brake and a parking brake, which preferably act on a common brake disc, or have common multiple brake discs.

In order to prevent a defective independent wheel drive from locking up the whole vehicle, provision is made in a preferred development of the invention such that the reduction stage has an axially disengageable gear element, in particular an axially displaceable gear wheel, for interrupting the power train in the reduction stage. By this means, the respective wheel can, as it were, be uncoupled. If the electric motor locks up, the vehicle is nonetheless able to travel onward with the remaining independent wheel drives. It goes without saying that the gear element interrupts the power train at a point which leaves the power train from the brake to the wheel hub unaffected. As described above, the rotating part of the brake can be fixed to a reduction stage element. The interruption of the power train in the reduction stage takes place on the electric motor side, whilst the power train from the brake to the wheel hub remains in place even in the retracted state of the displaceable gear element.

BRIEF DESCRIPTION OF THE DRAWINGS

The invention will be explained below in greater detail with the aid of preferred examples of embodiment and respective drawings. The drawings show the following.

DESCRIPTION OF THE PREFERRED EMBODIMENTS

Figure 1:
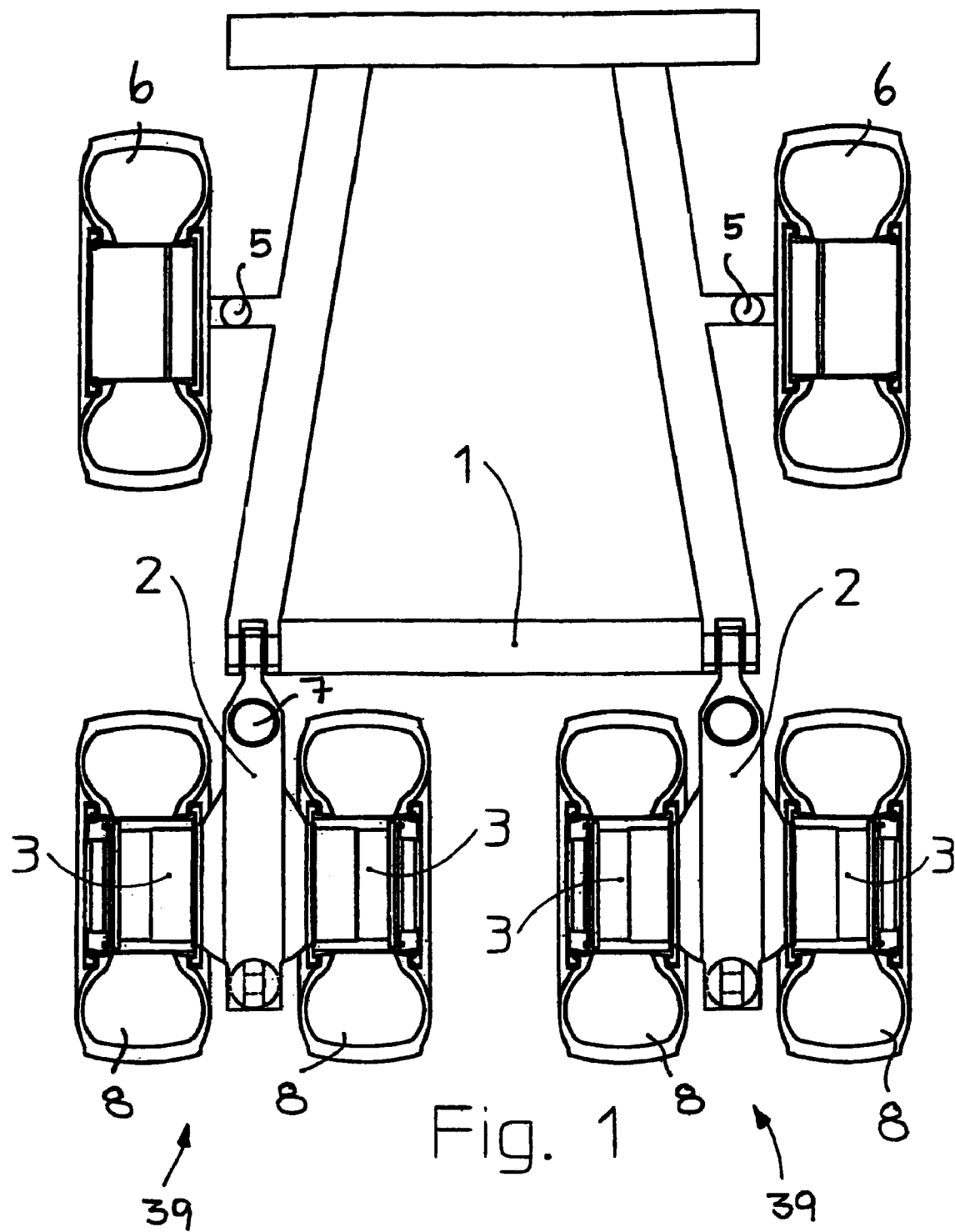
FIG. 1 a diagrammatic representation of the chassis of a bulk material dumping truck of the large dump truck type with a travel drive according to a preferred embodiment of the invention, FIG. 2 an enlarged representation of a rear wheel pair from FIG. 1, which is mounted on a rocker arm supported in a mobile manner on the vehicle frame, to the left and right of said rocker arm, whereby each wheel is driven separately by an independent wheel drive and the independent wheel drives are supplied with cooling air through the rocker arm, FIG. 3 an enlarged representation of a rear wheel pair similar to FIG. 2 according to an alternative embodiment of the invention, according to which the independent wheel drives are supplied with cooling agent through cooling agent lines inside the rocker arm, FIG. 4 an enlarged sectional view of an independent wheel drive of a rear wheel from the preceding figures, which shows the arrangement of an electric motor, a planet gear stage and the wheel brake, whereby a disc brake is provided as the brake, and FIG. 5 a sectional view of the independent wheel drive of a rear wheel from the preceding figures in a representation similar to FIG. 4, whereby a multiple disc brake is provided as the brake.

The chassis of a so-called large dump truck shown in FIG. 1 comprises a rigid vehicle frame 1, to which are coupled two front wheels 6 controllable respectively about an axle 5. A pair of parallel rocker arms 2 projecting backwards are coupled on a rear section of vehicle frame 1, which are supported in a suitable manner and capable of swivelling, relative to vehicle frame 1, about a horizontal axis extending at right angles to the travel direction, such as is shown in WO 92/04196. The two rocker arms 2 each carry a pair of rear wheels 8. As FIG. 1 shows, rocker arms 2 extend in each case between a pair of rear wheels 8, which are mounted to the right and left on respective rocker arm 2. The four rear wheels 8 form the drive axle of the vehicle. As FIG. 1 shows, an independent wheel drive 3 is assigned to each of rear wheels 8, so that rear wheels 8 can be driven independently of one another and at different speeds, which is of advantage particularly when tight bends are taken and prevents grinding of the wheels on account of different curved paths.

Figure 2:
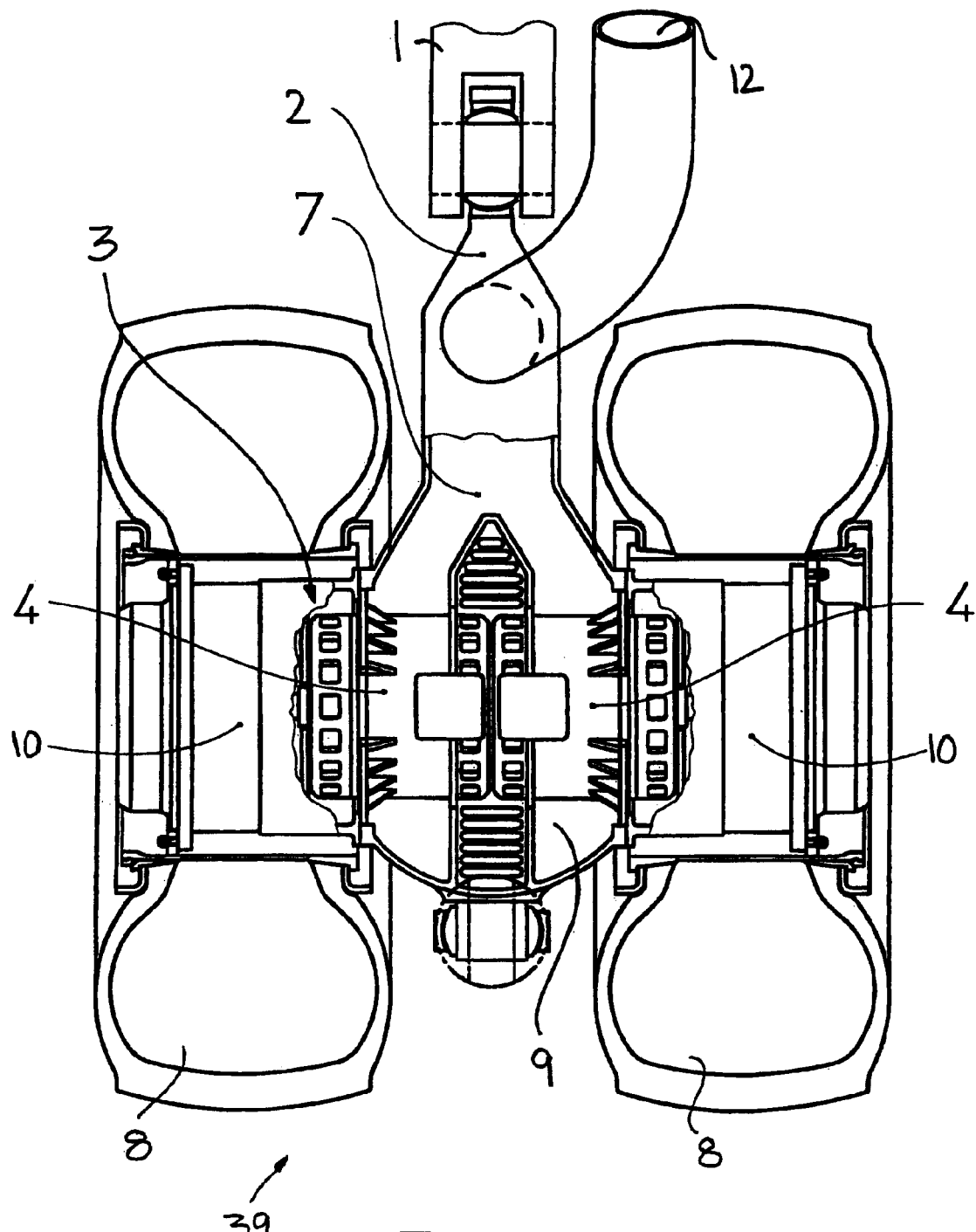

As FIG. 2 shows, the independent wheel drives are integrated into the interior of the rocker arm and the wheel axles and wheel hubs attached thereto. Each of rocker arms 2 widen towards the axis of wheels 8 and forms a central motor casing 9, in which two separate electric motors 4 are accommodated, which are both arranged coaxial with the rotary axis of the two rear wheels 8 fixed to rocker arm 2. Motor casing 9 formed integrally in one piece on rocker arm 2 has two openings facing the wheels. In the area of these openings, two gear casings 10 lying opposite one another are flange-mounted on motor casing 9, which gear casings are designed essentially pot-shaped and at the same time form the wheel axles for the two rear wheels 8. Wheel hubs 11, which carry rear wheels 8 and which will be described in greater detail, are fixed in a rotary manner on gear casings 10.

As FIG. 2 shows, electric motors 4 are air-cooled inside motor casing 9. The cooling air is fed through the interior of rocker arm 2, which in the interior has a cooling-air channel or is designed as a cooling-air channel.

The cooling air preferably circulates through rocker arm 2 and motor casing 9. Suitable inlet and outlet channels are provided for this. FIG. 2 shows inlet channel 12, through which the cooling air can be fed.

Figure 3:
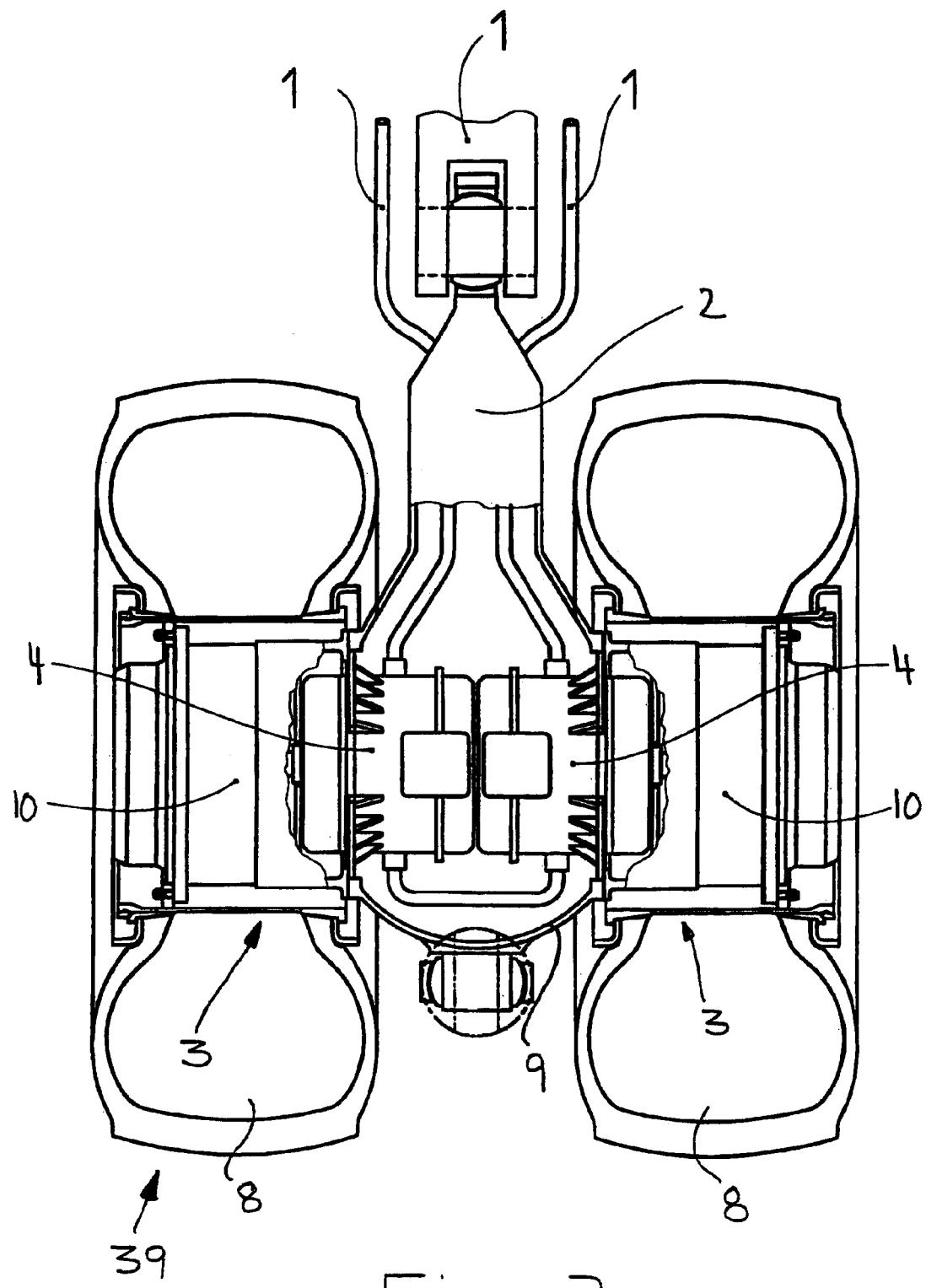

In an alternative embodiment of the invention, electric motors 4 can also be liquid-cooled. Here too, it is expedient for the cooling agent channels to be passed inside rocker arm 2. As FIG. 3 shows, cooling agent channels 13 emerge from rocker arm 2 in the immediate vicinity of the coupling point of rocker arm 2 and are conveyed from there to vehicle frame 1. The cooling agent is also circulated here. One of cooling agent lines 13 acts as a cooling agent feed and leads to the electric motors, whilst the other of the two cooling agent lines 13 acts as a cooling agent discharge. The two electric motors can be connected in series one after the other as regards the cooling agent circulation.

Figure 4:
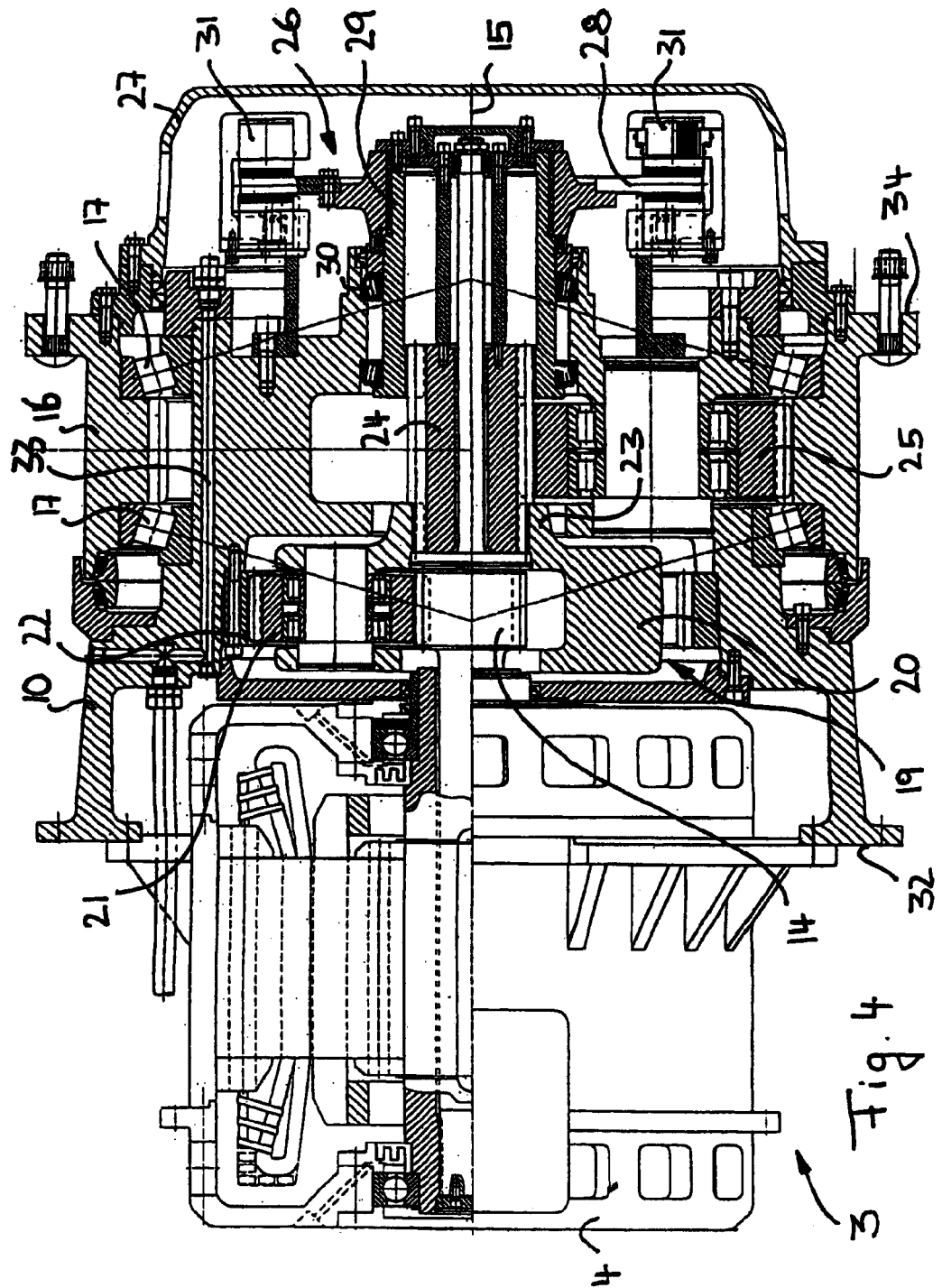

FIG. 4 shows the more detailed structure of each independent wheel drive and the brake assigned to each wheel. Electric motor 4, which can preferably be a frequency-regulated asynchronous motor, is arranged with its motor shaft 14 coaxial with rotary axis 15 of each wheel, whereby motor shaft 14 projects to the exterior, i.e. away from rocker arm 2 through corresponding motor casing opening 9 into gear casing 10. Said gear casing 10 is designed essentially rotation-symmetric and tapers towards the exterior, i.e. away from the rocker arm, step-by-step to a smaller diameter. Wheel hub 16 sits in a rotary-mounted manner on the outer periphery of gear casing 10, in particular on its section with reduced diameter. It is supported on motor casing 9 by means of two inclined cylindrical roller bearings 17.

A two-stage planet gear 18 is provided inside motor casing 9. A planet carrier 20 sits coaxially above motor shaft 14 and carries a plurality of planet wheels 21, which are mounted in a rotary manner on planet carrier 20. Planet wheels 21 engage on the one hand with toothed motor shaft 14 of electric motor 4. On the other hand, they engage with a toothed ring 22, which is arranged rigid with the gear casing and coaxially surrounds planet carrier 20. Planet carrier 20 is driven by motor shaft 14 of electric motor 4 via planet wheels 21. As FIG. 4 shows, planet carrier 20 has a toothed shoulder 23 projecting axially over motor shaft 4, said toothed shoulder engaging with a sleeve 24 arranged coaxial with the rotary axis of wheel 8. As FIG. 4 shows, sleeve 24 has an external tooth system, with which it sits in an internal tooth system of toothed shoulder 23. Sleeve 24 thus rotates with planet carrier 21.

Via sleeve 24, planet carrier 20 drives a further set of planet wheels 25, which are arranged distributed around rotary axes 15 and are mounted in a rotary manner on gear casing 10. Gear wheels 25 mesh on the one hand with sleeve 24. On the other hand, they engage with an internal tooth system of wheel hub 16, so that they drive wheel hub 16. As FIG. 4 shows, the internal tooth system of wheel hub 16 is provided between two roller bearings 17 on the inner periphery of the wheel hub.

The two-stage design of planet gear 19 between electric motor 4 and wheel hub 11 produces a large transmission ratio in the smallest possible space. In the form of embodiment shown, a transmission ratio of approx. 30 to 35 is provided, i.e. the speed of electric motor 4 is 30 to 35 times as great as the initial speed of wheel hub 16.

Brake 26 is designed as a disc brake in the embodiment according to FIG. 4. Brake 26 sits on the outside, i.e. on the side of planet gear 18 facing away from rocker arm 2. It is arranged inside the inner periphery of wheel hub 16. As FIG. 4 shows, it is enclosed by a wheel hub cap 27, which is connected on the end face with wheel hub 16.

Disc brake 28 forms the rotating part of the brake. Brake disc 28, however, is not fixed directly to wheel hub 16, but rotates with the speed of planet carrier 20. As FIG. 4 shows, brake disc 28 sits torsion-resistant on a sleeve-shaped brake disc carrier 29, which is mounted in a rotary manner on gear casing 10 by means of two inclined roller bearings 30 and engages with sleeve 24. Brake disc carrier 29, which is arranged coaxial with rotary axis 15 of the wheels, has an internal tooth system which sits on the external tooth system of sleeve 24.

The stationary part of brake 26 is formed by brake shoes 31, which are screwed to the end face of motor casing 10. Several brake shoes are preferably provided, in particular service brake shoes and parking brake shoes, which act on common brake disc 28.

Gear casing 10, which is shown in FIG. 4, sits with its inner flange 32 on motor casing 9, which is fixed rigidly to rocker arm 2 or is formed by the latter, as shown in FIG. 2. The operation of brake 26 preferably takes place hydraulically. As FIG. 4 shows, there are incorporated in gear casing 10 hydraulic channels 33, which connect a hydraulic line 34 inside motor casing 9 with the interior of wheel hub 16, in particular wheel hub cap 27, so that the brake shoes can be accordingly closed.

The fixing of the wheels on wheel hub 11 takes place in a manner known per se by means of a wheel hub flange 34 and suitable screw-bolt connections.

FIG. 5 shows an alternative embodiment of brake 26. As for the rest, the design of the independent wheel drive corresponds to that of FIG. 4, so that in this respect reference may be made to the description thereof. Brake 26 according to FIG. 5 is designed as a multiple disc brake. On the one hand, a rotating multiple disc carrier 35 is provided. The latter, like the previously described brake disc carrier 29, is not coupled directly with the wheel hub, but with the planet carrier. In particular, multiple disc carrier 35 engages with sleeve 24. Multiple disc carrier 35 possesses for this purpose a sleeve section 36, which is mounted in a rotary manner on gear casing 10 by means of roller bearings 30 and sits with an internal tooth system on the external tooth system of sleeve 24. Radially outside multiple disc carrier 35, the latter carries a set of rotating multiple brake discs 36. Between rotating multiple brake discs 36 are arranged stationery multiple brake discs 37, which are held in a torsion-resistant manner by a multiple disc carrier 38. As FIG. 5 shows, multiple disc carrier 38 that is not rotating is screwed down to gear casing 10 on its end face. Circular multiple brake discs 36 and 37 arranged axially one behind the other can be pressed next to one another by hydraulic pressure in a manner known per se. The hydraulic supply also takes place here through a hydraulic channel 33 extending through gear casing 10.

In order to be able to uncouple the wheel hub, reduction stage 19 can have a disengageable, in particular axially displaceable, gear element. In particular, provision can be made such that sleeve 24 with the external tooth system is mounted in an axially displaceable manner. For example, provision can be made such that sleeve 24 can be displaced a little far to the right according to FIGS. 4 and 5, so that it becomes disengaged from toothed shoulder 23 of planet carrier 20. In this way, the wheel hub can rotate with respect to planet carrier 20 and thus with respect to electric motor 4. On the other hand, the brake still remains engaged with the wheel hub.

The invention claimed is:

1. A travel drive for heavy goods vehicles, with several wheel pairs (39) forming a driven wheel axle, which wheel pairs are each supported by a separate rocker arm (2), which extends between the wheels (8) of the respective wheel pairs (39) and carries on opposite sides two wheel hubs (16), on which the wheels (8) can be attached, whereby there is provided for each wheel (8) of the wheel pair (39) an independent wheel drive (3) consisting of an electric motor (4) and a reduction stage (19), which transfers the drive motion of the electric motor (4) to the respective wheel hub (16), wherein there is provided for each wheel (8) of the wheel pair (39) an independent wheel brake (26), which is arranged on an outside of the respective electric motor (4) and/or the respective reduction stage (19) facing away from the respective rocker arm (2) and which is arranged, together with the respective electric motor (4) and the respective reduction stage (19), inside the respective wheel hub (16) and the associated wheel axle (11).

2. The travel drive according to claim 1, wherein a planet gear (19) is provided as the reduction stage, in particular a dual planet gear stage with a transmission ratio in the range from 20 to 40.

3. The travel drive according to claim 1, wherein the electric motor is arranged coaxial with the rotary axis (15) of the respective wheel hub (16).

4. The travel drive according to claim 1, wherein the wheel axle, on which the wheel hub (16) is mounted in a rotary manner, is formed by a casing (10) of the electric motor (4) and/or of the reduction stage (19).

5. The travel drive according to claim 1, wherein the wheel hub (16) is mounted on a gear casing surface area.

6. The travel drive according to claim 1, wherein the electric motors (4) can each be accommodated in a central motor casing (9), which is rigidly connected to the respective rocker arm (2), is preferably designed in one piece with the rocker arm, and on which a gear casing (10) is flange-mounted, whereby the gear casing (10) is at the same time designed as the driven wheel axle and carries the respective wheel hub in a rotary manner.

7. The travel drive according to claim 1, wherein the reduction stage (19) has an axially disengageable gear element (24), in particular an axially displaceable gear wheel, for interrupting a power train in the reduction stage.

8. The travel drive according to claim 1, wherein a stationary part (31;37;38) of the brakes (26) is fixed to an end face of the driven wheel axles, in particular of a gear casing (10), and a rotating part (28; 36) of the brakes (26) is coupled to a reduction stage element (24).

9. The travel drive according to claim 1, wherein the independent wheel brakes (26) each have a service brake and a parking brake.

10. The travel drive according to claim 1, wherein the independent wheel brakes (26) are designed as disc brakes.

11. The travel drive according to claim 1, wherein the independent wheel brakes (26) are designed as preferably wet-running multiple disc brakes.

12. The travel drive according to claim 1, wherein there is assigned to the electric motors (4) a liquid cooling (13) which has cooling agent lines (13) running along in the rocker arms (2).

13. The travel drive according to claim 2, wherein the electric motor is arranged coaxial with a rotary axis (15) of the respective wheel hub (16).

14. The travel drive according to claim 2, wherein the wheel axle, on which the wheel hub (16) is mounted in a rotary manner, is formed by a casing (10) of the electrice motor (4) and/or of the reduction stage (19).

15. The travel drive according to claim 13, wherein the wheel axle, on which the wheel hub (16) is mounted in a rotary manner, is formed by a casing (10) of the electric motor (4) and for of the reduction stage (19).

16. The travel drive according to claim 2, wherein the wheel hub (16) is mounted on a gear casing surface area.

17. The travel drive according to claim 3, wherein the wheel hub (16) is mounted on a gear casing surface area.

18. The travel drive according to claim 4, wherein the wheel hub (16) is mounted on a gear casing surface area.

19. The travel drive according to claim 13, wherein the wheel hub (16) is mounted on a gear casing surface area.

20. The travel drive according to claim 14, wherein the wheel hub (16) is mounted on a gear casing surface area.

* * * * *